(12) United States Patent
Dalvi (10) Patent No.: US 9,686,686 B1
(45) Date of Patent: Jun. 20, 2017

(54) LOCATING A LOST DEVICE USING CROWD GPS

(71) Applicant: Symantec Corporation, Mountain View, CA (US)

(72) Inventor: Omkar Dalvi, Culver City, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 14/818,524

(22) Filed: Aug. 5, 2015

(51) Int. Cl.
| | | |
|---|---|---|
| H04W 12/08 | (2009.01) | |
| H04W 4/02 | (2009.01) | |
| H04M 15/00 | (2006.01) | |
| G01S 19/01 | (2010.01) | |
| H04W 12/12 | (2009.01) | |

(52) U.S. Cl.
CPC ............. *H04W 12/08* (2013.01); *G01S 19/01* (2013.01); *H04M 15/7556* (2013.01); *H04W 4/023* (2013.01); *H04W 12/12* (2013.01)

(58) Field of Classification Search
CPC ..... H04W 12/08; H04W 12/12; H04W 4/023; H04M 15/7556; G01S 19/01
See application file for complete search history.

(56) References Cited

U.S. PATENT DOCUMENTS

| 7,674,298 | B1* | 3/2010 | Cambridge | ........ G08B 13/1409 |
| | | | | 713/168 |
| 8,717,172 | B2* | 5/2014 | Parker | .................... G08B 21/22 |
| | | | | 340/438 |
| 2005/0250446 | A1* | 11/2005 | Ishikawa | ................ G08B 21/24 |
| | | | | 455/41.2 |
| 2011/0057797 | A1* | 3/2011 | Parker | .................... G08B 21/22 |
| | | | | 340/568.1 |
| 2012/0171998 | A1* | 7/2012 | Kang | ....................... G06F 21/88 |
| | | | | 455/411 |
| 2013/0237204 | A1* | 9/2013 | Buck | ................. H04M 1/72569 |
| | | | | 455/418 |
| 2014/0221003 | A1* | 8/2014 | Mo | ........................ H04W 64/00 |
| | | | | 455/456.1 |
| 2015/0324617 | A1* | 11/2015 | Pai | .......................... G06F 21/88 |
| | | | | 726/35 |
| 2017/0034223 | A1* | 2/2017 | Arscott | ............... H04L 65/1069 |

* cited by examiner

*Primary Examiner* — Brandon Miller
(74) *Attorney, Agent, or Firm* — Maschoff Brennan (57) ABSTRACT

A method for lost device location is disclosed. The method includes transmitting a last known location from the lost device, receiving a command to lock the lost device at the lost device and locking the lost device. Machine identification data and current location data is transmitted from the lost device, that is accessible by a backend server, to a second device that is located within a designated proximity to the lost device.

20 Claims, 5 Drawing Sheets

LOCATING A LOST DEVICE USING CROWD GPS

BACKGROUND

An anti-theft system is any device or method used to prevent or deter the unauthorized appropriation of items. From the invention of the first lock and key to the introduction of RFID tags and biometric identification, anti-theft systems have evolved to match the introduction of new technologies and their risk of misappropriation.

As regards electronic technologies, anti-theft systems can be used to disable items with specific functionality and to prevent their use if they are stolen. The anti-theft system can require disabling on every use, or enabling when the item needs to be secured. Disabling the anti-theft system is usually done by requiring identification of the owner at some stage of use. Identification can occur through physical or other means (physical keys, numerical codes, complex passwords, biometric identification).

Conventional mobile phone anti-theft systems offer a range of options for finding or protecting a mobile phone: Global positioning system (GPS) location, sounding an alarm, locking the phone, wiping the data completely, etc. For example, if a mobile phone is lost in a place that is hidden from plain view, an alarm can be sounded such that it can be located, even if it is "on silent." If the phone has been stolen, the GPS can be used find the device.

Conventional mobile phone anti-theft systems that rely on GPS technology require internet connectivity in order to communicate current location information to backend systems that can act on the information. However, when mobile phones are stolen, their Subscriber Identity Module (SIM) cards are usually removed. The removal of a SIM card terminates a device's internet connectivity and data network connectivity through a carrier such that its ability to communicate current location information to backend systems is ended. In this way, the removal of a SIM card prevents a stolen device from being identified and located. Many conventional mobile phone anti-theft systems that rely on internet connectivity do not have an adequate response to the removal of the SIM card. As the anti-theft systems do not have access to current location information, many conventional mobile phone anti-theft systems do not have the capability to help locate stolen mobile phones.

It is within this context that the embodiments arise.

SUMMARY

Many conventional mobile phone anti-theft systems that rely on internet connectivity can be defeated by the removal of a SIM card that communicates current location information for the phone. In particular, because the anti-theft systems don't have access to current location information, such conventional mobile phone anti-theft systems do not have the capability to locate stolen mobile phones. Systems and methods for lost device location are disclosed that enable the location of stolen phones if the SIM card has been removed. However, the claimed embodiments are not limited to implementations that address any or all of the aforementioned shortcomings A method includes transmitting a last known location from the lost device, receiving a command to lock the lost device at the lost device and locking the lost device. Machine identification data and current location data is transmitted from the lost device that is accessible by a backend server to a second device that is located within a designated proximity to the lost device. The method establishes a channel through which a device that has no connection to the internet can communicate device identification and current location information to backend systems. As such, the disclosed methods and systems enable the location and identification of lost and/or stolen devices that have no internet connectivity.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings in which.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
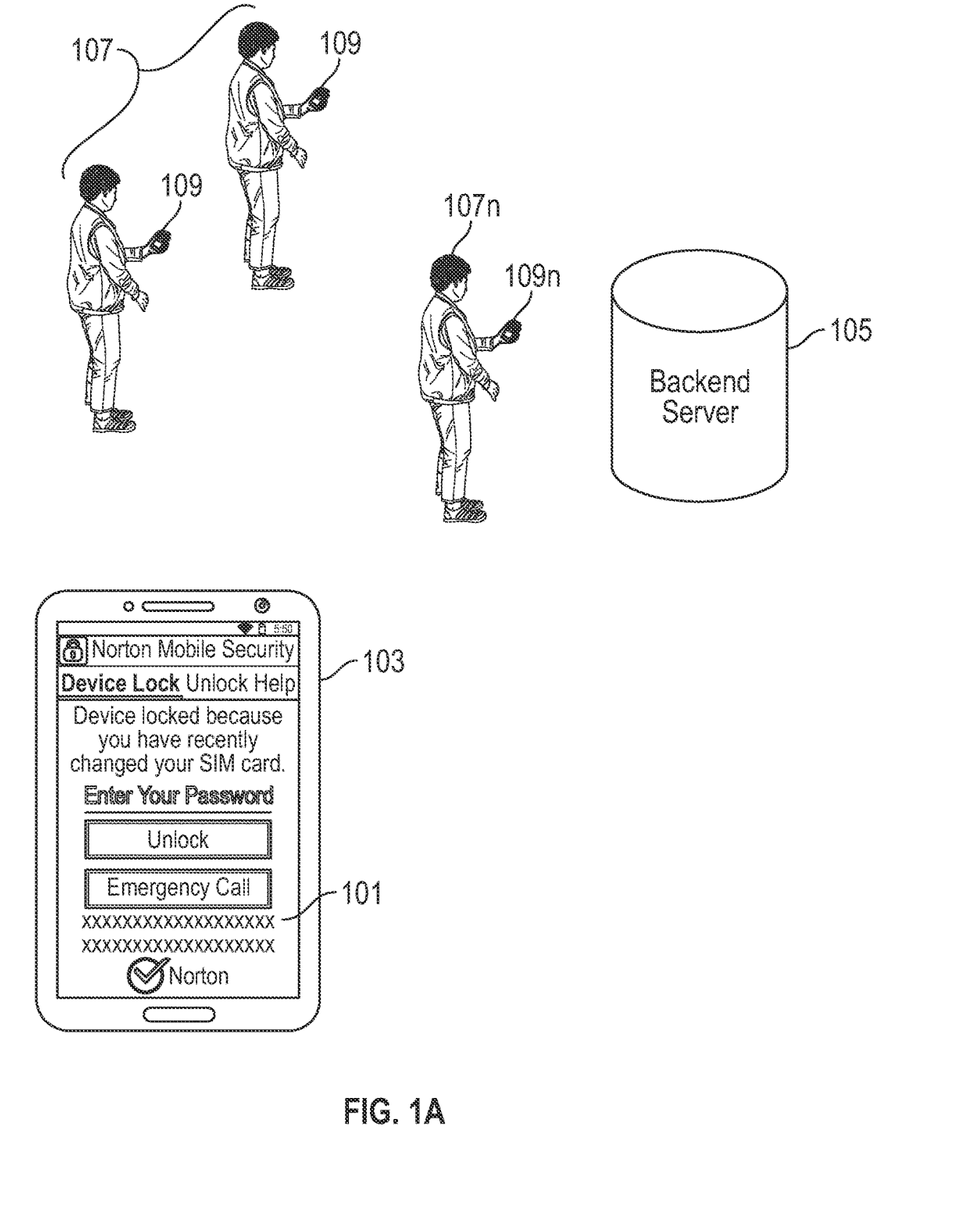
FIG. 1A shows a typical operating environment of a system for lost device location using crowd GPS according to one embodiment.

FIG. 1A shows a typical operating environment of a system 101 for lost device location using crowd GPS according to one embodiment. System 101 establishes a channel through which a device that has no connection to the internet or a cellular network can communicate device identification and current location information to backend systems. As such, system 101 enables the location and identification of lost and/or stolen devices that have no internet/cellular network connectivity. FIG. 1 shows system 101 for lost and/or stolen device location using crowd GPS, lost device 103, back-end server 105, subscriber crowd 107, and crowd GPS devices 109.

Still referring to FIG. 1A, lost device 103 (e.g., mobile phone, mobile computer, wearable mobile device, etc.) is a mobile device that has been lost and/or stolen. In one embodiment, lost device 103 can have mobile security system enabled anti-theft software (e.g., the NORTON MOBILE SECURITY (NMS) system of the assignee) and/or hardware installed thereon. In one embodiment, the mobile security enabled anti-theft system allows the owner of lost device 103 to lock and/or disable lost device 103 from a mobile security system portal (e.g., a web based mobile security system user interface). In some embodiments, the mobile security system can include system 101 which can reside on lost device 103 as a part of the mobile security system. In other embodiments, system 101 resides on lost device 103 and is separate from the mobile security system but can operate cooperatively with the mobile security system.

Continuing with FIG. 1A, system 101 responds to a command to activate the anti-theft lock system on lost device 103, by commencing the transmission by lost device 103 of its machine ID and current location information. In some embodiments, as referenced above, the command to activate the anti-theft lock system can be sent from a mobile security system portal or the command can be triggered in response to detecting removal of a SIM card of the device. The mobile security system portal allows device owners to remotely activate the anti-theft lock features of the anti-theft lock system. The activation of the anti-theft lock prevents the use of lost device 103 by individuals that find or abscond with the device. In this manner, access to lost device 103 functions, and information, stored on lost device 103, can be prevented.

In response to the activation of an anti-theft lock, system 101 directs the transmission from lost device 103, of a machine identifier (ID) which identifies lost device 103, and enables the ability to determine the current location of lost device 103. In one embodiment, crowd GPS devices 109 can be devices (e.g., mobile phones, mobile computers, wearable devices) that are owned by fellow subscribers to a mobile security system (e.g., NMS of the assignee, or other suitable mobile security system). Crowd GPS devices 109 that are located within a designated proximity to the recorded last known location of lost/stolen device 103 can receive the machine identification data and the current location data transmitted from lost/stolen device 103 and can transmit this data back to back-end server 105. In one embodiment, owners of crowd GPS devices 109 within a designated proximity of the last known location of lost device 103 can be queried to determine their willingness to receive data transmitted by lost device 103 such that the data can be accessed (e.g., retrieved or received) by back end server 105. It should be appreciated that the designated proximity is related to the communication protocol utilized to communicate between lost/stolen device 103 and crowd GPS device 109. Thus, the designated proximity may be the boundary set for Wireless Fidelity (WiFi), Bluetooth, or Near Field Communication (NFC) in some embodiments.

Backend server 105 maintains a record of lost devices and the last known locations of the lost devices in a suitable data structure, such as a list. Backend server 105 monitors a predetermined proximity surrounding the last known locations for the presence of members of subscriber crowd 107. In one embodiment, backend server 105 can query one or more selected members of subscriber crowd 107 to determine their willingness to allow their device to be used to relay data that is being transmitted by lost device 103 to backend server 105. If a member(s) of subscriber crowd 107 is willing to relay data that is being transmitted by the lost device 103 to backend server 105, backend server 105 can receive this information and act on the information and/or provide the information to the owner of lost device 103.

Subscriber crowd 107 may be a group of owners of mobile devices (e.g., mobile phones, mobile computing devices, mobile wearables) who are fellow subscribers to a mobile security system shared by the lost/stolen device in some embodiments. Members of subscriber crowd 107 who are within a predetermined proximity of the last known location of lost device 103 can be identified by backend server systems 105. In one embodiment, such subscribers can be queried to determine their willingness to allow their mobile devices to be used to relay data that is being transmitted by lost device 103. Mobile device 109$n$ is the mobile device of a member 107$n$ of subscriber crowd 107 who is willing to allow their device to be used to accept data that is being transmitted by lost device 103. As previously described, after the information is received by mobile device 109$n$, this information is forwarded and can be accessed by backend server 105 and provided to the owner of lost device 103 through a web portal, email, or other suitable mechanism.

Figure 1B:
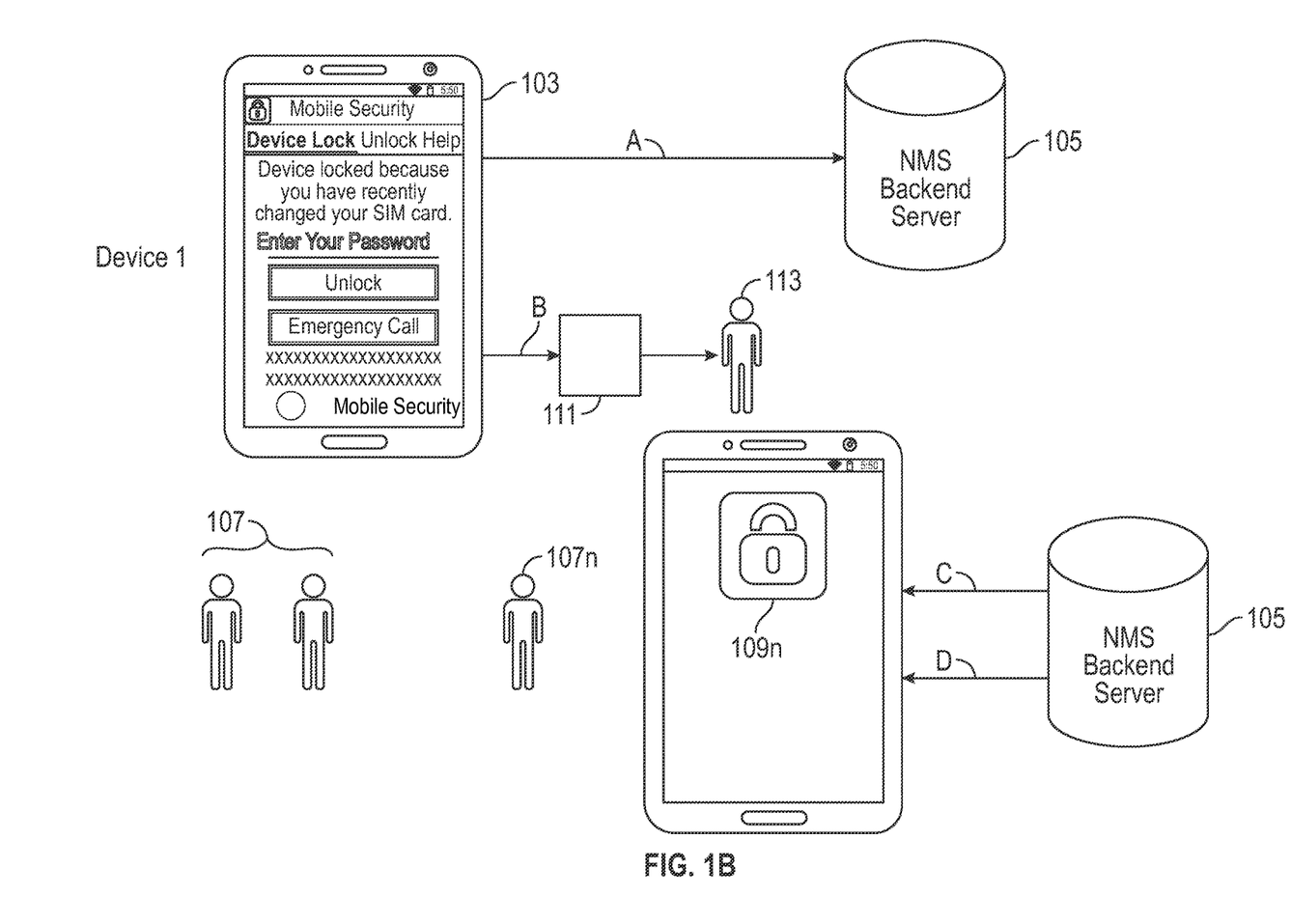
FIGS. 1B and 1C illustrate the operation of a system for lost device location using crowd GPS according to one embodiment.
Figure 1C:
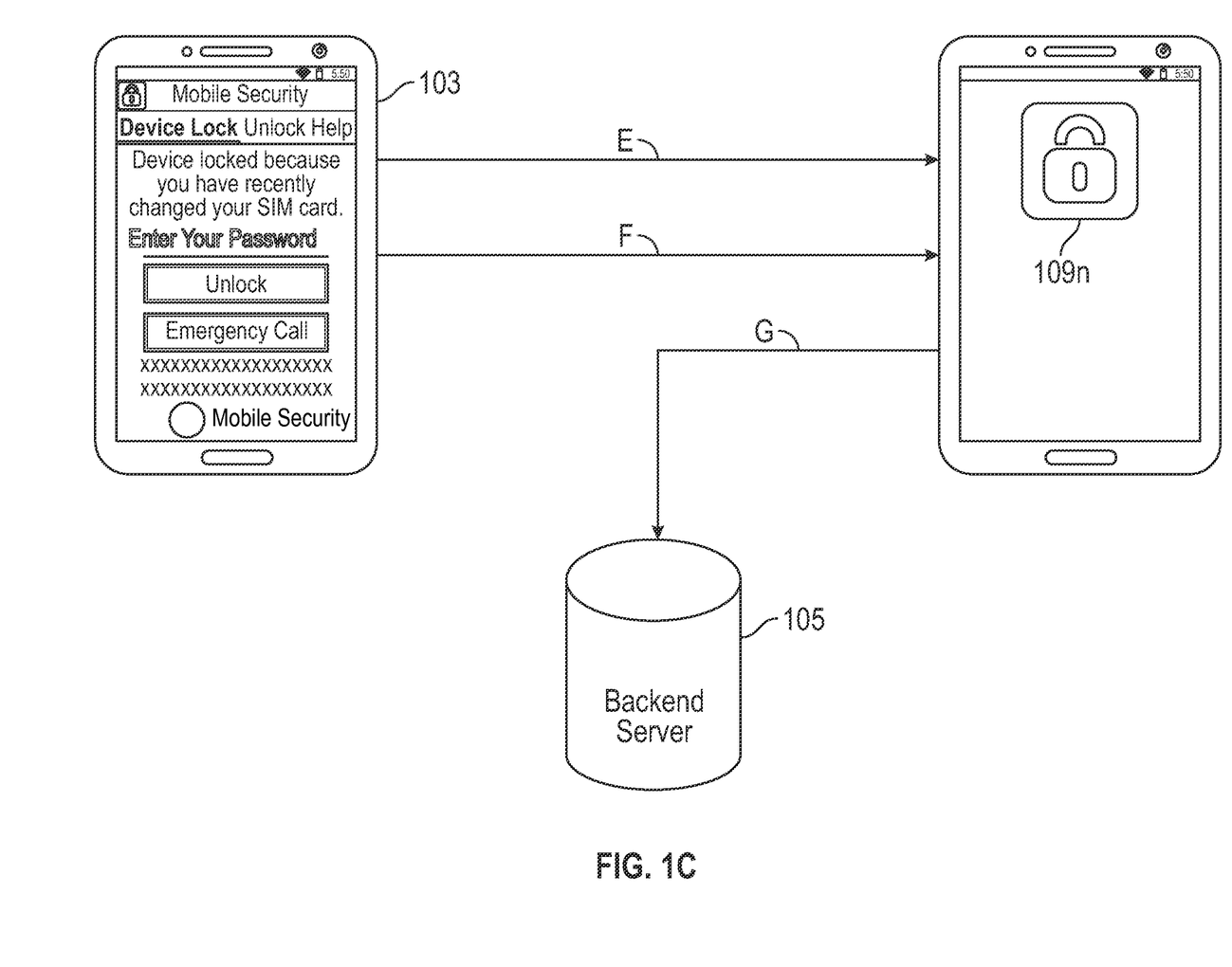

FIGS. 1B and 1C illustrate operations of system 101 for lost device location using crowd GPS, and other components of a typical operating environment, according to one embodiment. These operations, which relate to the lost device location, are only exemplary. It should be appreciated that other operations not illustrated in FIGS. 1B and 1C can be performed in accordance with some embodiments. Referring to FIG. 1B, at A, device 103 communicates its location to backend server 105. In one embodiment, the location is the last known location communicated to backend server 105 before device 103 is locked. At B, device 103 is designated as lost or stolen in response to detecting the device's SIM card 111 is removed by an individual 113 who has obtained unauthorized possession of device 103. As mentioned above, SIM card 111 is removed by individual 113 in order to prevent device 103 from being tracked.

Still referring to FIG. 1B, at C, backend server 105 identifies a mobile security system subscriber crowd member 107$n$ that has a mobile device 109$n$ that is located in the same area as the last known location of lost device 103. Subscriber crowd member 107$n$ can be identified from among a plurality of subscriber crowd members within a designated proximity to the last known location of device 103. In other situations, subscriber crowd member 107$n$ can be the lone subscriber crowd member who is within a designated proximity to the last known location of device 103. At D, backend server 105 sends a prompt that queries subscriber crowd member 107$n$ to determine if subscriber crowd member 107$n$ is willing to accept communications from lost device 103 using a communication protocol that mobile device 109$n$ is equipped to communicate with and that enables mobile device 109$n$ to make information from lost device 103 accessible to backend server 105.

Referring to FIG. 1C, at E, a communication channel is established between lost device 103 and mobile device 109$n$ owned by subscriber crowd member 107$n$ (e.g., crowd GPS device). At F, lost device 103 sends the device ID and current location information to mobile device 109$n$ as an encrypted message in some embodiments. At G, the message from lost device 103 that contains the device ID and current location information is uploaded to backend server 105. The backend server 105 updates the location of the lost device in the data structure storing this information and informs the owner of the location of lost device 103. It should be appreciated that while FIGS. 1B and 1C illustrate a screenshot related to the NMS system, this is not meant to be limiting as alternative mobile security system may integrate the embodiments described herein. In addition, variations can include communication across different mobile security systems.

Figure 2:
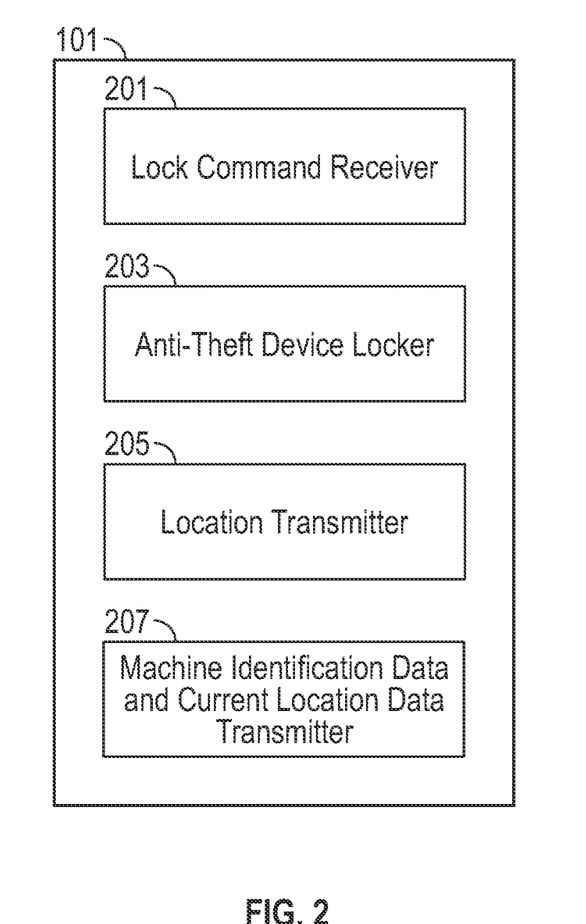
FIG. 2 shows components of a system for lost device location using crowd GPS according to one embodiment.

FIG. 2 shows components of system 101 for lost device location using crowd GPS according to one embodiment. The components of system 101 implement an algorithm for lost device location according to one embodiment. The components of system 101 may reside on a lost mobile device (e.g., lost mobile device 103 in FIGS. 1A-1C). In the embodiment of FIG. 2, components of system 101 include lock command receiver 201, anti-theft device locker 203, location transmitter 205 and machine identification data and current location data transmitter 207.

Lock command receiver 201 receives commands to activate an anti-theft lock on a device (such as a mobile phone, tablet, wearable device, etc.) that has been lost or stolen, such that information (private data, content, etc.) that is stored thereon is protected. In one embodiment, the command can be sent from a security portal of a mobile device security system that allows mobile device security system subscribers to activate anti-theft lock features on lost devices. It should be appreciated that the activation of the features may be through a web based portal that is provided for subscribers of any suitable mobile security system. In some embodiments removal of the SIM card from the device may trigger the activation of the anti-theft lock mechanism of system 101.

Anti-theft device locker 203 locks the lost device by preventing the use of the lost device. In some embodiments, preventing the use of the lost device can include preventing access to device functions, and, information that is stored on the lost device. In one embodiment, anti-theft device locker 203, locks the device in response to a command to lock the device that is received by lock command receiver 201, and the command can be triggered through a web based portal associated with the anti-theft security system or upon detection of removal of the SIM card from the mobile computing device. Anti-theft device locker 203 is code stored in memory that is executed through a processor of the device to prevent the use of the mobile computing device and can include functionality preventing access to device functions and information that is stored on the device. For example, the input functionality for the device may be locked out in some embodiments through the anti-theft device locker 203. It should be appreciated that various alternative lock-out mechanisms may be employed with the embodiments.

Location transmitter 205 transmits the location of the device, in an ongoing manner to a back-end server (e.g., 105 in FIG. 1A) that maintains a record of this information (e.g., a log of the transmitted locations). After the device is lost, and the owner of the device directs the locking of the device, the last location that was transmitted before the device was locked is designated as "the last known address." This location is stored and correlated with the device ID in some embodiments. The device ID of the lost device is stored on the back-end server as a part of a list of the IDs of lost devices. In some embodiments, the GPS functionality of the computing device is maintained even upon removal of the SIM card. Therefore, the device can continually or periodically update the location of the device by broadcasting the location information as generated through the GPS functionality of the device. This current location data may be transmitted through location transmitter 205 or machine identification data and current location data transmitter 207 as explained below. Alternatively, the current location may be updated through the subscriber crowd. That is, as the lost/stolen device moves, the subscriber crowd may continually be updated (additional devices located with the proximity of the lost/stolen device) through the location information provided through the subscriber crowd to the backend server.

Machine identification data and current location data transmitter 207 transmits machine identification data that identifies the lost device and current location information/data. In some embodiments, subscriber crowd mobile devices (e.g., 109 in FIG. 1A) that are located within a designated proximity to the recorded last known location of the lost device can receive the machine identification data and current location information/data and can make this data accessible to the backend server (e.g., by transmission or any other manner of data access). Crowd GPS devices that are located within a designated proximity of the last known location of the lost or stolen device can be queried to determine their willingness to receive the machine identification data from the lost or stolen device so that the machine identification and location information can be relayed to and accessed (retrieved, received, etc.) by the back end server. It should be appreciated that location transmitter 205 and machine identification data and current location data transmitter 207 may be combined as a single functional block, also referred to as a transmitter component, or multiple discreet blocks (multiple transmitter components) performing discreet functionality. In some embodiments, the current location information may be supplied through location transmitter 205. Accordingly, numerous variations can be covered by the embodiments. In addition, the components of system 101 may be embodied as hardware, software, firmware or some combination of the these embodiments.

Figure 3:
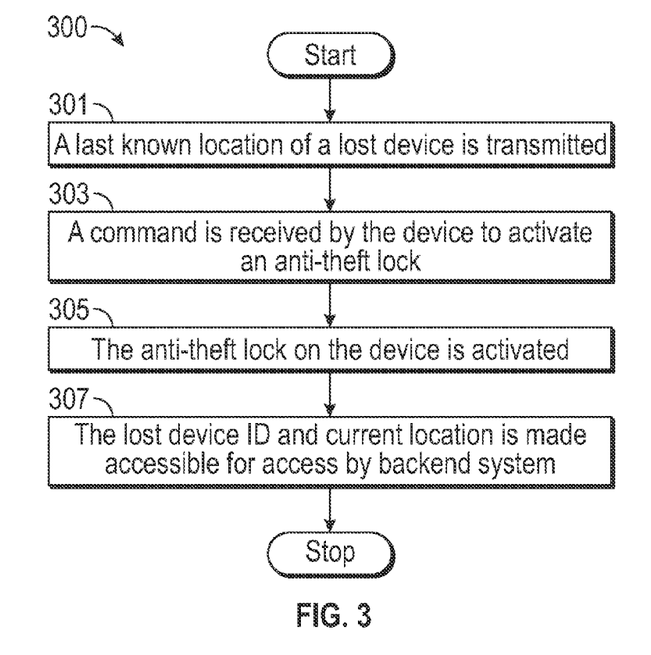
FIG. 3 shows a flowchart of a method for lost device location using crowd GPS according to one embodiment.

FIG. 3 shows a flowchart 300 of the steps performed in a method 300 for lost device location using crowd GPS according to one embodiment. The flowchart includes processes that, in one embodiment can be carried out by processors and electrical components under the control of computer-readable and computer-executable instructions. Although specific steps are disclosed in the flowcharts, such steps are exemplary. That is, the present embodiment is well suited to performing various other steps or variations of the steps recited in the flowchart. Referring to FIG. 3, at 301 a last known location of a lost device (103 in FIG. 1A) is transmitted. As is described herein, the last known location of the lost device is transmitted from the lost device to a backend server (e.g., 105 in FIG. 1A). It should be appreciated that in some embodiments, the lost device may periodically update the location information as determined through the GPS functionality of the device even though a SIM card has been removed from the device.

At 303, a command is received by the lost device to activate an anti-theft lock on the lost device. In one embodiment, the anti-theft lock prevents the use of the lost device and access to device functions and information. In some embodiments, the anti-theft lock is activated in response to a command to lock the device received through a mobile device security system. In alternative embodiments, the command is triggered automatically in response to detecting removal of the SIM card of the device. At 305, the anti-theft lock on the device is activated in response to the command. The anti-theft lock prevents any input into the device, e.g., the device input functions may be locked out.

At 307, the lost device ID and the current location of the lost device is transmitted from the lost device to a device within a designated proximity of the lost device and is forwarded by the device within the designated proximity to the backend server. In one embodiment, the backend server can then notify the owner of the lost device of the lost device's location. In addition, the current location can be used by the backend server to update the records of the backend server such that the last known location of the lost device is updated to be the current location of the lost device. It should be appreciated that the backend server may locate further devices within the designated proximity of the updated current location in some embodiments.

The embodiments employ crowd GPS which features the utilization of a device of a user of an anti-theft security system in proximity to a lost device (e.g., 103 in FIG. 1A), to provide a communication channel from the lost device. In one embodiment, the location of lost and/or stolen devices which have no internet connectivity (such as when a SIM card, e.g., 111 in FIG. 1B, has been removed) is enabled. The communication channel between the lost device and the proximate device may through a Wireless Fidelity (WiFi) standard, near field communication (NFC) standard, Bluetooth standard, or some other communication protocol or standard that enables device to device communication. In some embodiments, the communication protocol or standard enables an ad hoc network between devices or a peer to peer connection between the devices. As mentioned above the distance between the lost device and the proximate device may be limited through the specific communication protocol as well as other environmental aspects. Thus, a WiFi connection may be over a larger area than a Bluetooth or NFC connection is some embodiments. In one embodiment, crowd GPS is taken advantage of as mobile devices of subscriber crowd members utilizing the same mobile security system, or even a different mobile security system, can be used as a means of communicating with backend systems.

In one embodiment, when a subscriber crowd member (e.g., 107n in FIG. 1B) is determined to be in the proximity of the last known location of a lost mobile device that is being tracked, this presence is registered by backend server systems (e.g., 105 in FIG. 1A). The backend server systems maintain a database of lost mobile devices in a list or other suitable data structure. As mentioned above, a lost device that includes system 101 broadcasts device identification data and location data using a protocol that can include but is not limited to WiFi, NFC, Bluetooth or some other suitable communication protocol enabling device to device communication. The identification data and location data is forwarded to the backend server via a device communication with the lost or stolen device. Based on data maintained by the backend server system, a notification can be sent to a fellow subscriber of the mobile security system (e.g., a subscriber crowd member such as 107n in FIG. 1B) used by a lost device, indicating that there is a lost device located within a designated proximity to his/her current location in some embodiments. As a part of the notification, the fellow subscriber can be queried to determine if they would be willing to turn on a communication system of their mobile device to allow the lost device to communicate with the fellow subscriber's device. The communication system can include but is not limited to WiFi/NFC/Bluetooth communication protocols, and can be used to establish communication between the lost/stolen device and the fellow subscriber's device. In some embodiments an ad hoc network or peer to peer communication link is established between the two devices. Upon establishing communication with the lost/stolen device the mobile device of the fellow subscriber can be used to obtain device identification and location information that can be accessed by backend server systems.

In one embodiment, when the anti-theft lock feature is activated, the lost and/or stolen device is prompted to start to broadcast identification (used by the backend to identify individual devices) and location information using a communication protocol that as described herein, can include but is not limited to WiFi, NFC and Bluetooth. In one embodiment, this information is encrypted and can be received by another device which is registered and shares the mobile security system utilized by the lost/stolen device. In this manner, the lost device can send the location information to the device of a fellow subscriber of the mobile security system, which subsequently forwards the location information, which may be encrypted, to the backend server.

As mentioned above, the information that is sent to the device (e.g., 109n in FIG. 1A) of the fellow subscriber that is in proximity to the stolen device can be an encrypted file. The fellow subscribers' device should have internet connectivity and has the mobile security system software installed thereon (as does the lost device). After the encrypted file is sent to the fellow subscriber's device, the encrypted file can then be uploaded to backend systems (e.g., backend server 105 in FIG. 1A). In this manner, the backend system can obtain updated information related to the location of the lost and/or stolen device after decrypting the data. In one embodiment, the backend server can maintain a list of lost devices and their current locations as reported by subscribers of the mobile security system.

Figure 4:
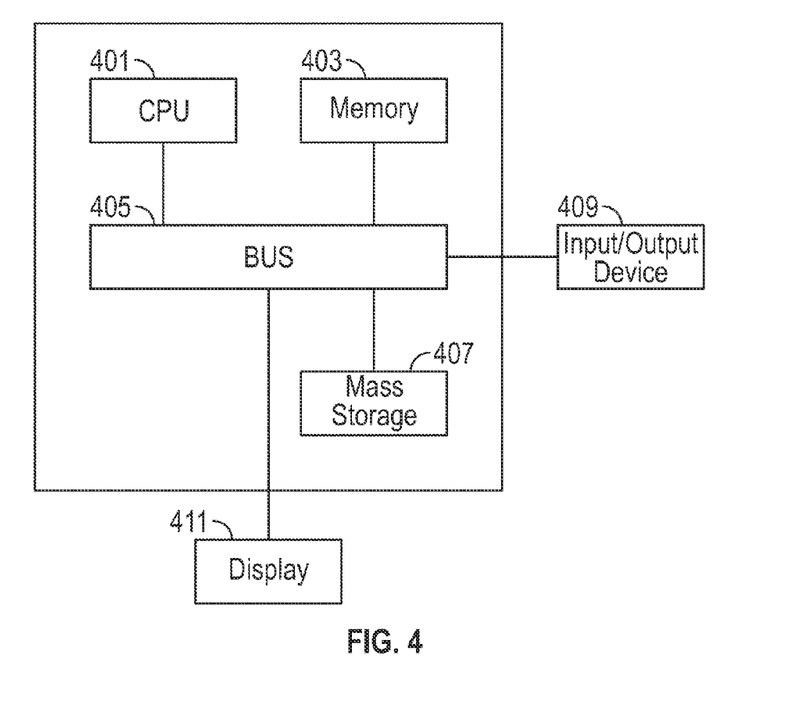
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality described above in accordance with some embodiments. The computing device includes a central processing unit (CPU) 401, which is coupled through a bus 405 to a memory 403, and mass storage device 407. Mass storage device 407 represents a persistent data storage device such as a disc drive, which may be local or remote in some embodiments. The mass storage device 407 could implement a backup storage, in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be MS DOS™, MS-WINDOWS™, iOS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for device location, the method comprising:
   transmitting a last known location for a first device;
   determining that the first device is lost;
   at the first device, receiving a command to lock the first device;
   locking the first device;
   selecting, at a backend server, from a plurality of mobile devices subscribing to a mobile security system, one or more subscriber mobile devices that are located within a designated proximity to the last known location for the first device; and
   in response to the locking of the first device, transmitting machine identification data and current location data that is accessible by the backend server to a second device that is one of the selected one or more subscriber mobile devices.

2. The method of claim 1 wherein the determining is responsive to detecting removal of a (Subscriber Identity Module) SIM card from the first device.

3. The method of claim 1 further comprising:
   updating the last known location periodically through a GPS system.

4. The method of claim 1 wherein the machine identification data is encrypted.

5. The method of claim 1 further comprising:
   maintaining a list of lost devices and last known locations of each of the lost devices; and
   periodically updating the last known location of the first device within the list.

6. The method of claim 1, further comprising:
   querying, by the backend server, the selected one or more subscriber mobile devices to determine willingness to relay data transmitted by the first device, wherein the second device is notified that the first device is within the designated proximity to a current location of the second device.

7. The method of claim 1 wherein the second device uses a wireless protocol to communicate with the first device.

8. A mobile security system, comprising:
   a receiving component that, at a first device, receives a command to lock the first device;
   a locking component that, in response to the command, locks the first device; and
   a transmitting component that, in response to a locking of the first device, transmits current location data and machine identification data that is associated with the first device, and that is accessible by a server, to a second device that is located in a designated proximity to the first device, wherein the server is configured to select, from a plurality of mobile devices that subscribe to a mobile security system, one or more subscriber mobile devices, including the second device, that are located within the designated proximity to a last known location of the first device so that location data and machine identification data can be relayed from the first device to the server via the second device.

9. The system of claim 8, wherein the receiving component receives the command to lock the first device from a mobile security system portal.

10. The system of claim 8, wherein the command to lock the first device is responsive to removing a SIM card from the first device.

11. The system of claim 8 wherein the transmitting component transmits an encrypted version of the current location data and the machine identification data.

12. The system of claim 8 wherein the server maintains a list of lost devices.

13. The system of claim 8, wherein the server is further configured to query the selected one or more subscriber mobile devices to determine willingness to relay data transmitted by the first device, and wherein the second device is notified that the first device is within a designated proximity to a location of the second device.

14. The system of claim 8 wherein the second device uses a wireless protocol to communicate with the first device while the first device is in a locked state.

15. A mobile phone, comprising:
   a processor; and
   data storage components, the data storage components storing a mobile security system, the system comprising:
   a receiving component that, at the mobile phone, receives a command to lock the mobile phone;
   a locking component that, in response to the command, locks the mobile phone; and
   a transmitting component that, in response to the locking of the mobile phone, transmits current location data and machine identification data that is associated with the mobile phone and that is accessible by a server via a second device that is located within a designated proximity to the mobile phone, wherein the server is configured to select, from a plurality of mobile security system subscribing mobile devices, one or more subscribing mobile devices, including the second device, that are located within the designated proximity to the mobile phone, and that can accept location data and machine identification data from the mobile phone to relay to the server.

16. The mobile phone of claim 15 wherein the receiving component receives the command to lock the mobile phone from a mobile security system portal.

17. The mobile phone of claim 15 the command to lock the mobile phone is responsive to removing a SIM card from the mobile phone.

18. The mobile phone of claim 15 wherein the transmitting component transmits an encrypted version of the current location data and the machine identification data.

19. The mobile phone of claim 15 wherein the server maintains a list of lost devices.

20. The mobile phone of claim 15, wherein the server is further configured to query the selected one or more subscriber mobile devices including the second device to determine whether each of the one or more subscriber mobile devices is willing to relay data transmitted by the first device, and wherein the second device is notified that the mobile phone is within a designated proximity to a current location of the second device.

\* \* \* \* \*